May 3, 1966
F. J. BLUME ET AL
3,249,205
GUIDE MEANS FOR CONVEYOR TURNS
Filed Jan. 21, 1964
2 Sheets-Sheet 1
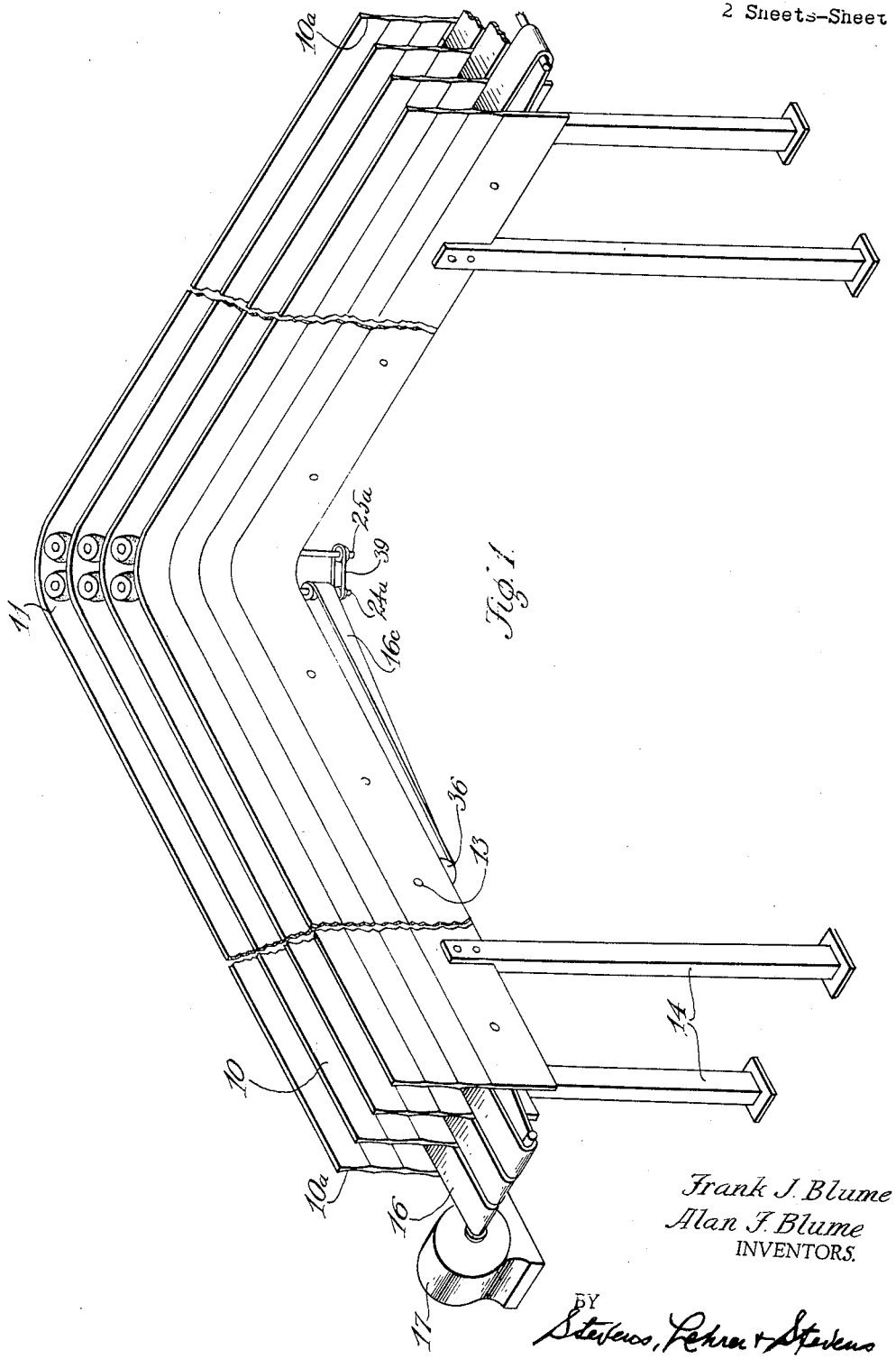
Frank J. Blume
Alan J. Blume
INVENTORS.
BY Stevens, Lehrer & Stevens
Attorneys.

May 3, 1966   F. J. BLUME ET AL   3,249,205
GUIDE MEANS FOR CONVEYOR TURNS
Filed Jan. 21, 1964   2 Sheets-Sheet 2
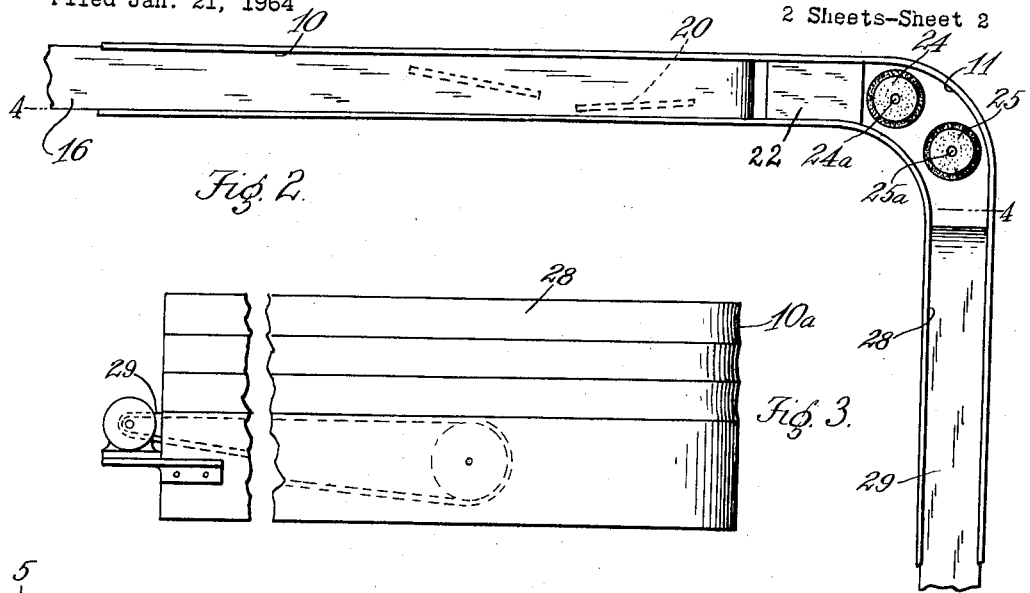
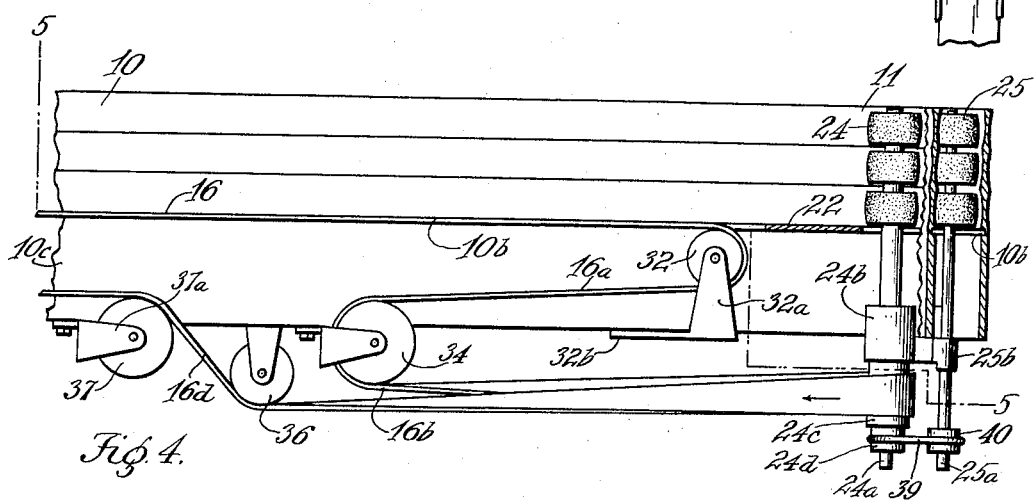
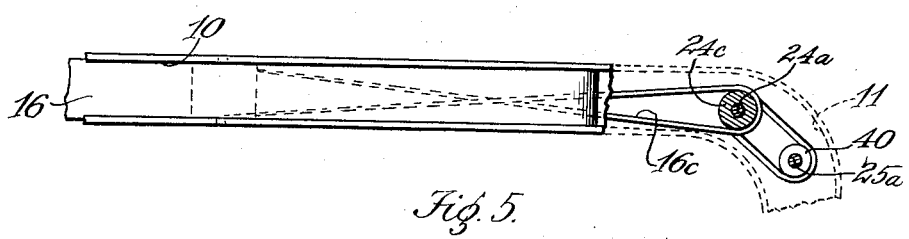
Frank J. Blume
Alan F. Blume
INVENTORS.
BY
Stevens, Lehrer + Stevens
Attorneys.

United States Patent Office 3,249,205
Patented May 3, 1966

3,249,205
GUIDE MEANS FOR CONVEYOR TURNS
Frank J. Blume and Alan F. Blume, both of
2730 N. Ashland Ave., Chicago, Ill.
Filed Jan. 21, 1964, Ser. No. 339,184
11 Claims. (Cl. 198—160)

Our invention relates to conveyors employed for dispatching office items, such as documents, bills, time cards, orders, and the like from a sending source in business establishments to other points on the same floor. Points of destination are often quite distant from the sending source, and located in different directions; and conveyors are employed for transporting the paper items and made with channels which are grouped laterally in close formation at the source, the channels branching out toward the different destinations, so that different office items may be deposited in designated channels for dispatch to corresponding destinations. Conveyors designed for this purpose employ motor-operated belts in constant motion and designed to receive the paper items on edge and dispatch them at high speed to the selected destinations.

In dispatching paper items in the manner just described, no difficulty is experienced when the destination of any conveying channel is in a straight line from the source. However, the presence of office partitions, desks, machines or other equipment over the expanse of a floor usually makes it necessary to lead conveyor channels in divergent or far-flung directions, and bends are therefore used where channels turn in lateral directions along the course of the conveyor. The practice has been to train the horizontal conveyor belts carrying the paper items around a curve by twisting the belt into a vertical plane where it rounds the curve, and untwisting the belt to its normal level after it has passed the curve. This procedure is made feasible by mounting guide pulleys for the belt in suitable positions in the region of the curve. While a belt so trained may itself operate efficiently, its effect on paper items designed for passage around the curve presents difficulties. Thus, while some items may be carried through smoothly by passing between the vertical turn of the belt and the adjacent wall of the conveyor channel, often the tug on the paper at the twist of the belt is too short to draw the paper item evenly around the turn. As a result, the paper item is drawn out of line, distorted or folded, causing it to clog the channel and make succeeding paper items pile up or pack in the conveyor. The dispatch or distribution of the paper items therefore becomes interrupted and the conveyor must be stopped and serviced.

The main object of the present invention is to eliminate difficulty in the passage of paper items around conveyor turns by supplementing the horizontal belt runs with separate guide means which engage the items gently, and lead them in their normal upstanding positions around the curve to continue their travel.

A further object is to provide guide means of the above character which are positive in action and geared to operate at the same speed as the horizontal belt runs of the conveyor, so that the travel of the paper items is continuous and uniform at all points in the conveyor channels.

Another object is to locate only the novel guide means in the passages of the channel turns, and to put a drive mechanism for the guide means underneath the channels, so as to be out of the way.

An important object is to construct the said guide means and drive mechanism along simple lines, and with a minimum number of parts.

A better understanding of the invention may be gained by reference to the accompanying drawings, in which:

FIG. 1 is a perspective view of fragments of a multichannel conveyor incorporating the invention;

FIG. 2 is a top plan view of one channel in the region of a turn;

FIG. 3 is a fragmental elevation of the showing in FIG. 2, from the right-hand side;

FIG. 4 is a vertical section along the line 4—4 of FIG. 2; and

FIG. 5 is a plan section along the line 5—5 of FIG. 4.

Referring specifically to the drawings, 10 denotes the channels of the conveyor where they extend in a straight course, and 11 where a turn occurs between the straight portions. This turn may be broad, or at 90 degrees, as seen in FIG. 2. FIG. 1 shows that a group of the channels 10 may be bolted together by cross-rods 13—or other suitable means—wherever necessary, and provided with legs 14 to extend at a height suitable for the deposit of paper items into the channels. Since a series of conveyor belts 16 travel in the floors of the channels, an electric motor 17 is provided at the source of the conveyor for jointly driving the belts 16 for advancing any paper items deposited in the conveyor.

The walls of the channels 10 are made of long strips whose upper portions have a vertical series of shallow flutes 10a on both sides. Thus, when a pair of walls are positioned to form a channel, the inner surfaces thereof will only present edges for minimum frictional contact with any paper item which may be traveling in the channel. The channels will therefore present no appreciable resistance to the travel of paper items therethrough.

FIG. 4 shows a belt run 16 for conveying paper items, and in a position approaching the curved portion 11 of a channel 10, as indicated by arrows. The same figure shows at the extreme right that the channel walls are made with facing grooves 10b; and the belt run 16 is guided at the sides in the grooves 10b where the sides of the channel are straight. As indicated in FIG. 2, paper items 20 deposited in the channel 10 and carried by the belt run 16 toward the channel turn 11 pass over a floor insert 22 when they leave the belt on the way to a pair of rollers 24 and 25 located in the channel turn 11. These rollers are carried by upstanding spindles 24a and 25a which rotate the rollers in clockwise direction as seen from the top. The spindles are geared—as will be explained later—to impart the same surface speed to the rollers as that of the belt 16. In order to make the curvature of the rollers broad, they are of a diameter larger than the normal width of the channel curve 11; and the channel is widened along the curve as seen in FIG. 2 to accommodate the rollers in closely-spaced relation. FIG. 4 shows that the rollers 24 and 25 are stacked in three sections, each with a convex periphery. However, the number of sections employed is optional, although replacement is more economical with a multi-section roller if one section wears faster than another. The material of the rollers is sponge rubber or similar plastic substance. It is therefore apparent from FIG. 2 that a paper item approaching the channel turn and meeting the broad periphery of the rotating roller 24 will be deflected instantly toward the outer wall of the channel curve and drawn along the same for subsequent engagement by the roller 25, which will then whisk the paper item out of the curve into a lateral continuation 28 of the channel. Here a conveyor belt 29, at the level of the belt 16, operates in the departing direction—as shown in FIGS. 2 and 3—to carry the paper item in a direction at right-angles to its previous course toward its destination or through other conveyor sections along the way.

While various methods may be employed to gear the conveyor belt 16 and the rollers 24 and 25 for synchronized operation as mentioned above, the arrangement principally illustrated in FIG. 4 is considered the simplest and most efficient. Thus, it is noted that the belt run 16 is trained over a pulley 32 before the channel curve 11 to continue within the channel at a lower level with a rearward run 16a, the pulley operating in a pulley bracket 32a rising from another bracket 32b bolted to the lower portion 10c of the channel 10. The rearward belt run 16a is trained over a second pulley 34 to emerge from the lower portion of the channel and extend in forward direction as a run 16b, the pulley 34 being journaled in a bearing 34a bolted to the lower portion of the channel as shown. The right-hand portion of the same figure shows a pair of vertical bearings 24b and 25b which journal the vertcal spindles 24a and 25a, such bearings being suitably attached to the channel 10. Below the bearing 24b the spindle 24a carries a plain pulley 24c; and the latter is extended with a grooved pulley 24d. It is now seen in the same figure that the run 16b of the belt 16 is twisted gradually to engage the pulley 24c and in a direction to turn the spindle 24a as previously explained. The belt run 16b then assumes a rearward course in the form of a run 16c which is gradually twisted as shown to terminate in a return run 16d for the conveyor traveling in a horizontal plane in the channel, as shown. To bring the run 16d to this position it is first trained over an idler pulley 36 from below, and then raised to mount a second idler pulley 37 and continue rearwardly in the channel as shown. The idler pulleys are carried by bearing brackets 36a and 37a, respectively, such brackets being attached to the channel.

The mechanism just described connects only the roller 24 operatively with the conveyor belt; and the roller 25 is made to rotate in harmony with its companion by receiving a round belt drive 39 from the grooved pulley 24d on a similar pulley 40 mounted on the lower portion of the spindle 25a.

It is now apparent that the most important feature of the invention resides in the feed rollers 24 and 25 for the paper items, first for the roller 24 to intercept them gently and with a rounding movement in the feeding direction, second for the same roller to train the paper item into the curvature of the outer channel wall with light pressure while continuing the advance feed, and third to pass the paper item to the roller 25 for similar treatment and training to eject the item from the turn for continued travel at right angles from its previous course in a conveyor channel like the first one. Further, the soft rubber material of the rollers causes them to bear on the paper items with sufficient friction to insure their propulsion through the runs of the conveyor without lag or loss of speed. Also of importance is the fact that the conveyor belts are confined to straight upper runs in all the linear portions of the channels, and that such runs have no deformations or extensions in the turns of the channels. Further, the conveyor belt of each channel is used conveniently in zones below and well clear of the traveling path of the paper items for operating the feed rollers, the design of the belt and roller drives being simple and so compact as to permit independent installations of such drives in closely-grouped channels. Finally, the roller installation is compatible with the high speed propulsion of the paper items for passing them around conveyor turns rapidly, smoothly and without any deviating, deterring or deforming influences.

We claim:

1. A conveyor having angularly related linear channels interconnected by a lateral channel turn, said channels and channel turn having side walls, said channels and turn providing communicating passages between said walls, a belt operable along the floor of each channel for conveying upstanding sheet items deposited in said passage toward and beyond the turn, and powered roller means in the turn entirely between the side walls for passing the items from one channel to the next, such means operative to maintain the items in the upstanding position while training them to follow the turns.

2. The structure of claim 1, said roller means having upstanding axis of rotation generally parallel to the walls and substantially centered therebetween, and said roller means engaging the items from the side in a direction to advance them.

3. The structure of claim 1, said means being rollers of yieldable material engaging the items from the side frictionally in the advancing direction.

4. The structure of claim 1, said means being rotatable rollers operable at the speed of the belts and engaging the items from the side in a direction to advance them, and the spacing between the walls of the turn being wider than the normal spacing between the channel walls.

5. The structure of claim 1, said means being a pair of rotatable rollers, one where the items enter the turn and the other where they leave it, such rollers engaging the items from the side in a direction to advance them, each turn having an outer wall with inwardly projecting ribs developing grooves therebetween, and each roller having peripheral vertically spaced portions disposed in horizontal alignment with the grooves between said ribs.

6. The structure of claim 1, said means being a pair of rotatable rollers, one where the items enter the turn and the other where they leave it, such rollers engaging the items from the side in a direction to advance them, and the rollers operable at the speed of the belts, said channel turn being widened along the curve, and said rollers being of a diameter larger than the normal width of the passages in the linear channels.

7. The structure of claim 1, such means comprising upstanding rotary spindles, and at least one roller carried by each spindle and engaging the items from the side in a direction to advance them, and one of the walls of the channel turn being an outer wall, and each roller having a peripheral portion opposing the outer wall, and said rollers moving in a direction for engaging and dragging the items through the turn between said peripheral portions and the outer wall.

8. The structure of claim 1, guides for the belt underneath the channels, and said means comprising upstanding rotary spindles, and at least one roller carried by each spindle and engaging the items from the side in a direction to advance them, each roller being of larger diameter than the normal spacing between the walls of the linear channels.

9. The structure of claim 1, the belt having an end-loop below the zone of each turn, and said means comprising an upstanding rotary spindle, and at least one roller carried by the spindle and engaging the items from the side in a direction to advance them, the spindle being driven by said end-loop.

10. The structure of claim 1, and said means comprising an upstanding rotary spindles, and at least one roller carried by each spindle and engaging the items from the side in a direction to advance them, said linear channels being arranged in side by side relation and certain of the walls constituting an outer side of one channel and the outer side of the adjacent channel and the turns being disposed in nested relation.

11. The structure of claim 1, the belt having one end-loop below the zone of each turn, and said means comprising an upstanding rotary spindle where the items enter the turn and another where they leave it, at least one roller carried by each spindle and engaging the items from the side in a direction to advance them, the first spindle being driven by said end-loop, and a separate drive from the first spindle to the second in the direction of said advance.

References Cited by the Examiner

UNITED STATES PATENTS

| | | | |
|---|---|---|---|
| 1,077,092 | 10/1913 | Montgomery | 198—103 X |
| 1,801,906 | 4/1931 | D'Humy et al. | 198—204 |
| 1,992,349 | 2/1935 | Deardsley et al. | 198—160 |
| 2,016,268 | 10/1935 | Griffith | 198—160 |
| 2,090,697 | 8/1937 | Needham | 198—160 |
| 2,196,390 | 4/1940 | Gates | 198—103 X |
| 3,042,185 | 7/1962 | Welch | 198—160 |

EVON C. BLUNK, *Primary Examiner.*

SAMUEL F. COLEMAN, *Examiner.*

R. J. HICKEY, *Assistant Examiner.*